US012603312B2

(12) United States Patent
Jang et al.

(10) Patent No.: US 12,603,312 B2
(45) Date of Patent: Apr. 14, 2026

(54) FUEL CELL SYSTEM

(71) Applicant: LG ELECTRONICS INC., Seoul (KR)

(72) Inventors: Heejoong Jang, Seoul (KR); Dongkeun Yang, Seoul (KR); Hyoungsuk Woo, Seoul (KR); Jihoon Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 646 days.

(21) Appl. No.: 17/983,020

(22) Filed: Nov. 8, 2022

(65) Prior Publication Data

US 2023/0155148 A1     May 18, 2023

(30) Foreign Application Priority Data

Nov. 12, 2021    (KR) ........................ 10-2021-0155853

(51) Int. Cl.
H01M 8/04746         (2016.01)
H01M 8/04007         (2016.01)
                (Continued)

(52) U.S. Cl.
CPC ...  H01M 8/04768 (2013.01); H01M 8/04029 (2013.01); H01M 8/04067 (2013.01); H01M 8/04358 (2013.01); H01M 8/0618 (2013.01)

(58) Field of Classification Search
CPC ......... H01M 8/04768; H01M 8/04029; H01M 8/04067; H01M 8/04358; H01M 8/0618;
(Continued)

(56) References Cited

U.S. PATENT DOCUMENTS

2003/0031900 A1    2/2003  Tajima et al.
2008/0063902 A1    3/2008  Kawasaki et al.
                (Continued)

FOREIGN PATENT DOCUMENTS

CN          1455966        11/2003
CN          1910775        2/2007
                (Continued)

OTHER PUBLICATIONS

Korean Office Action dated Nov. 10, 2023 issued in Application No. 10-2021-0155853.
(Continued)

*Primary Examiner* — Stewart A Fraser
(74) *Attorney, Agent, or Firm* — KED & ASSOCIATES, LLP

(57)         ABSTRACT

A fuel cell system may include: a stack for generating power through an electrochemical reaction of reforming gas and air; a fuel processing apparatus for generating the reforming gas supplied to the stack; a water supply tank for storing the water; a heat recovery tank for storing hot water; a first heat exchanger disposed in the fuel processing apparatus, and exchanging heat between cooling water and exhaust gas discharged from the fuel processing apparatus; and a heat supply valve for supplying the cooling water to the water supply tank or the heat recovery tank so as to heat the water stored in the water supply tank or the hot water stored in the heat recovery tank.

18 Claims, 8 Drawing Sheets

(51) Int. Cl.
*H01M 8/04029* (2016.01)
*H01M 8/0432* (2016.01)
*H01M 8/0612* (2016.01)

(58) Field of Classification Search
CPC ........ H01M 8/04007; H01M 8/04164; H01M
2250/405; H01M 8/04014; H01M
8/04365; H01M 8/04373; H01M 8/04776
See application file for complete search history.

(56) References Cited

U.S. PATENT DOCUMENTS

| | | | | |
|---|---|---|---|---|
| 2010/0047645 A1* | 2/2010 | Miyauchi | ................ | F24D 12/02 |
| | | | | 429/495 |
| 2010/0285377 A1* | 11/2010 | Tamura | ............... | H01M 8/0618 |
| | | | | 422/105 |
| 2012/0021321 A1* | 1/2012 | Yasuda | ............. | H01M 8/04768 |
| | | | | 429/442 |
| 2012/0040260 A1* | 2/2012 | Morita | ............. | H01M 8/04029 |
| | | | | 429/414 |
| 2017/0162890 A1* | 6/2017 | Abe | ................. | H01M 8/04768 |

FOREIGN PATENT DOCUMENTS

| | | | |
|---|---|---|---|
| JP | 2002-216810 | A | 8/2002 |
| JP | 2004-247084 | A | 9/2004 |
| JP | 2007-280638 | | 10/2007 |
| JP | 2010-272343 | | 12/2010 |
| JP | 2011-136867 | | 7/2011 |
| KR | 10-2002-0086641 | | 11/2002 |
| KR | 10-2013-0116645 | | 10/2013 |
| WO | WO 2015/039673 | | 3/2015 |

OTHER PUBLICATIONS

Japanese Office Action dated Feb. 6, 2024 issued in Application 2022-180700.
European Search Report dated Sep. 27, 2024, in Application No. 22205755.6.
Japanese Notice of Allowance dated Oct. 22, 2024, in Application No. 2022-180700.
Chinese Office Action dated Dec. 13, 2025 issued in Application No. 202211392350.8.

* cited by examiner

1

FUEL CELL SYSTEM

CROSS-REFERENCE TO RELATED APPLICATION

This application claims priority under 35 U.S.C. § 119 to Korean Application No. 10-2021-0155853, filed on Nov. 12, 2021, whose entire subject matter is hereby incorporated by reference.

BACKGROUND

1. Field

The present disclosure relates to a fuel cell system, and more particularly, to a fuel cell system that warms up a stack or generates hot water by recovering waste heat of exhaust gas that is discharged from a fuel processing apparatus.

2. Background

A fuel cell system is a generation system that generates electric energy by electrochemically reacting hydrogen included in a hydrocarbon based material (e.g., methanol, ethanol, natural gas, etc.) with oxygen.

A fuel cell system may include a fuel processing apparatus for reforming fuel including a hydrogen atom into hydrogen gas, and a stack for generating the electric energy by using the hydrogen gas supplied from the fuel processing apparatus. The fuel cell system may include a heat exchanger and a cooling water pipe that cool the stack and recovery heat, a power transform apparatus that transforms produced direct current power into alternated current power, etc.

Based on a generation operation of the fuel cell system, a speed of an electrochemical reaction of oxygen and hydrogen made in the stack depends on a temperature of the stack, and the operation may be performed while keeping an appropriate temperature according to a type of stack. However, upon an initial generation operation of the fuel cell system, since the temperature of the stack corresponds to a low-temperature state, there may be a problem in that the generation is not smoothly achieved until the temperature of the stack reaches an appropriate predetermined temperature. Further, as a result, there may be a problem in that a significant time is required until normal power generation of the fuel cell system.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
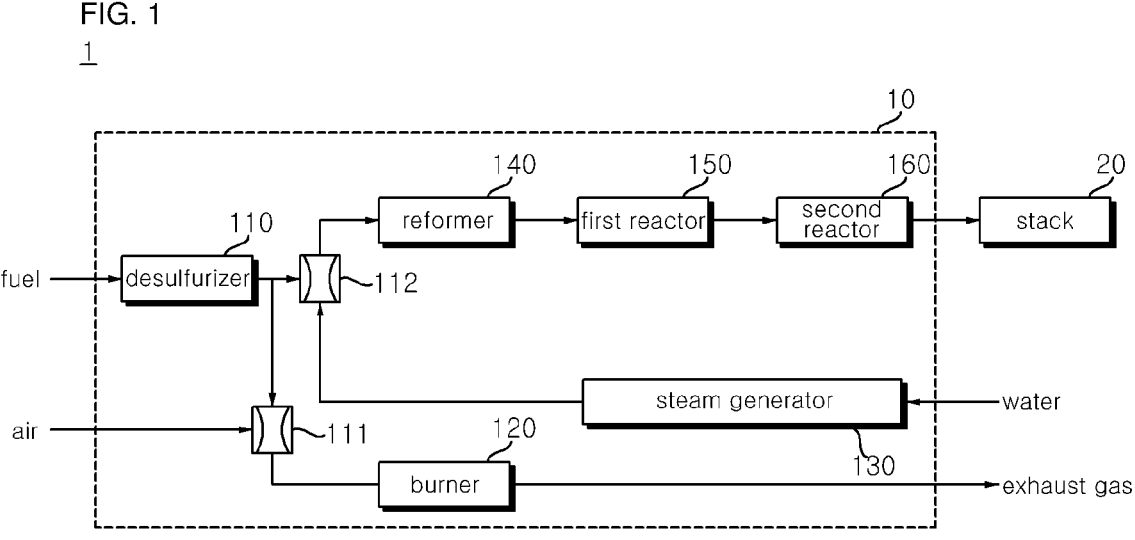
FIG. 1 is a schematic view for a configuration of a fuel processing apparatus according to an embodiment of the present disclosure.

The present disclosure will be described in detail with reference to the drawings. Parts not associated with required description are not illustrated to clearly and briefly describe the present disclosure and the same reference numerals are used for the same or extremely similar part throughout the specification.

Suffixes "module" and "unit" for components used in the following description are given in consideration of easy preparation of the specification only and do not have their own particularly important meanings or roles. Accordingly, the "module" and "unit" may be used interchangeably.

It should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Further, terms such as first, second, etc., may be used in order to describe various elements, but the elements are not limited by the terms. The terms may be used only for distinguishing one element from the other element.

FIG. 1 is a schematic view for a configuration of a fuel processing apparatus according to an embodiment of the present disclosure. The fuel processing apparatus may refer to pipes that connect components and/or allow flow of liquid/gas. The pipes (and paths) may also be structures such as channels, conduits, paths, etc.

The fuel processing apparatus 10 (or fuel processor) may include a desulfurizer 110, a burner 120, a steam generator 130 (or vapor generator), a reformer 140, a first reactor 150, and/or a second reactor 160. The fuel processing apparatus 10 may further include at least one mixer 111 and 112. Each of the components of the fuel processing device may be a structural component.

The desulfurizer 110 may perform a desulfurization process of removing a sulfur compound included in fuel gas. For example, the desulfurizer 110 may have an adsorbent therein. In this example, the sulfur compound included in the fuel gas passing through the inside of the desulfurizer 110 may be adsorbed into the adsorbent. The adsorbent may be composed of a metal oxide, Zeolite, activated carbon, etc.

The desulfurizer 110 may further include a foreign substance included in fuel gas.

The burner 120 may supply heat to the reformer 140 so as to promote a reforming reaction in the reformer 140. For example, the fuel gas discharged from the desulfurizer 110 and air introduced from the outside may be mixed by the first mixer 111 and supplied to the burner 120. In this example, the burner 120 combusts mixed gas in which the fuel gas and the air are mixed to generate combination heat. In this example, an internal temperature of the reformer 140 may be maintained to an appropriate temperature (e.g., 800° C.) by the heat supplied by the burner 120.

The exhaust gas generated by the burner 120 by the combustion of the mixed gas may be discharged to the outside of the fuel processing apparatus 10.

The steam generator 130 (or vapor generator) may vaporize water and discharge the vaporized water as a water vapor. For example, the steam generator 130 absorbs the heat from the exhaust gas generated by the burner 120, and the first reactor 150 and/or the second reactor 160 to vaporize the water.

The steam generator 130 may be disposed adjacent to a pipe in which the exhaust gas discharged from the first reactor 150, the second reactor 160, and/or the burner 120 flows.

The reformer 140 may perform a reforming process of generating hydrogen gas from fuel gas from which the sulfur compound by using a catalyst. For example, the fuel gas discharged from the desulfurizer 110 and the water vapor discharged from the steam generator 130 may be mixed by the second mixer 112 and supplied to the reformer 140. In this example, when the fuel gas supplied to the reformer 140 reforming-reacts in the reformer 140, the hydrogen gas may be generated.

The first reactor 150 may reduce carbon monoxide generated by the reforming action among components included in the gas discharged from the reformer 140. For example, the carbon monoxide included in the gas discharged from the reformer 140 reacts with the water vapor inside the first reactor 150, and as a result, carbon dioxide and the hydrogen may be generated. In this example, the internal temperature of the first reactor 150 may be a temperature (e.g., 200° C.) lower than the internal temperature of the reformer 140 and higher than a room temperature.

The first reactor 150 may be referred to as shift reactor.

The second reactor 160 may reduce carbon monoxide which remains among components included in the gas discharged from the first reactor 150. For example, a preferential oxidation (PROX) reaction may occur in which the carbon monoxide included in the gas discharged from the first reactor 150 reacts with the oxygen inside the second reactor 160.

Meanwhile, in the example of the preferential oxidation reaction, since a large amount of oxygen is required, additional supply of air is required, and the hydrogen is diluted by the additionally supplied air and a concentration of the hydrogen supplied to the stack is reduced. Accordingly, in order to overcome such a disadvantage, a selective methanation reaction in which the carbon monoxide and the hydrogen react may be utilized.

The gas discharged from the fuel processing apparatus 10 via the reformer 140, the first reactor 150, and/or the second reactor 160 may be referred to as reforming gas.

The stack 20 may incur an electrochemical reaction in the reforming gas supplied from the fuel processing apparatus 10 to generate electric energy. The stack 20 may be constituted by stacking a single cell in which the electrochemical reaction occurs.

The single cell may be constituted by a membrane electrode assembly (MEA) in which a fuel electrode and an air electrode are disposed around an electrolyte membrane, a separator, etc. In the fuel electrode of the membrane electrode assembly (MEA), the hydrogen is separated into hydrogen ions and electrons by the catalyst to generate electricity and in the air electrode of the membrane electrode assembly (MEA), the hydrogen ions and the electrons are combined with the oxygen to generate the water.

The stack 20 may include a stack heat exchanger for dissipating heat generated during an electrochemical reaction process. The stack heat exchanger may be a heat exchanger that uses the water as a refrigerant. For example, cooling water supplied to the stack heat exchanger may absorb the heat generated during the electrochemical reaction process, and cooling water of which temperature rises by the absorbed heat may be discharged to the outside of the stack heat exchanger.

Figure 2:
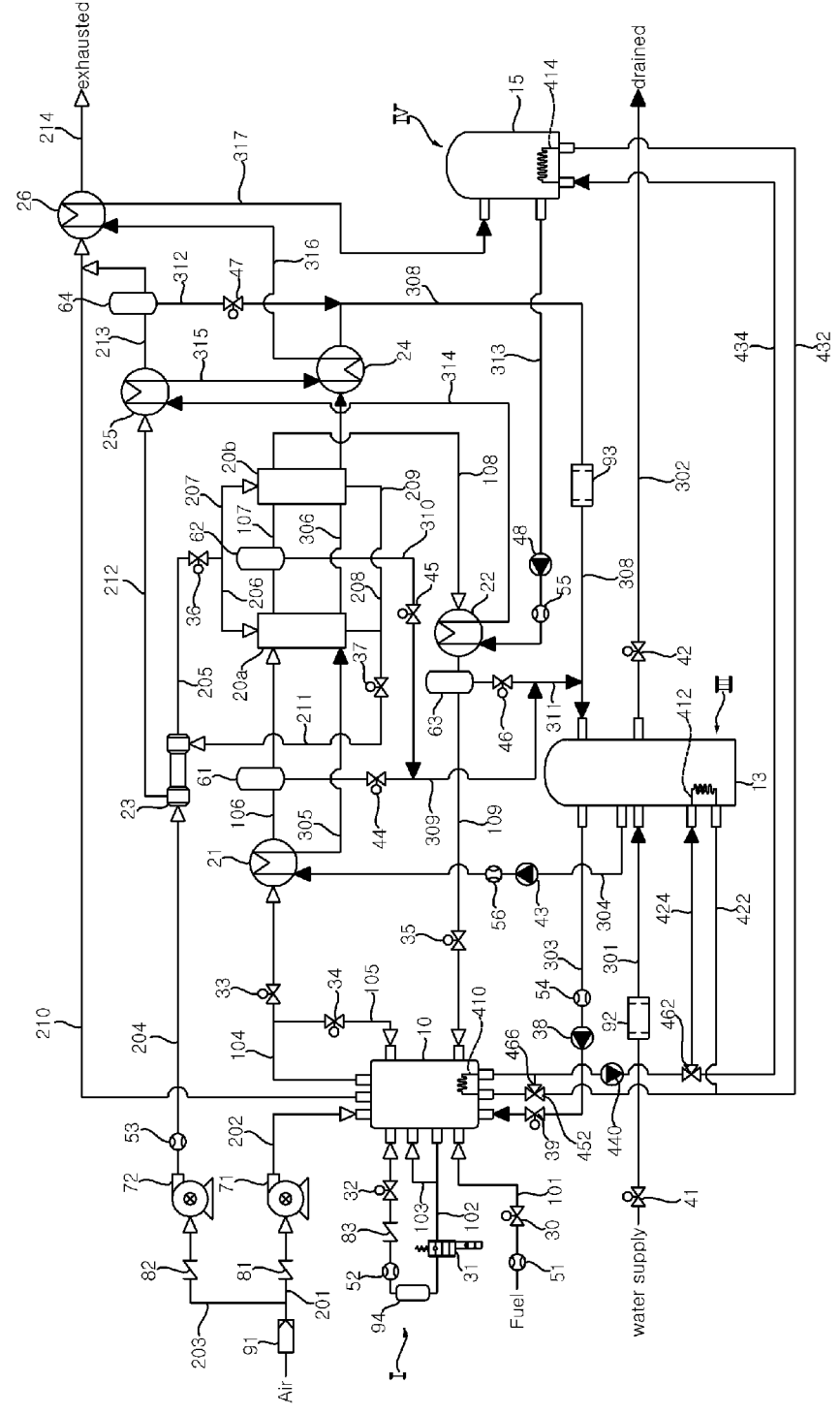
FIG. 2 is a configuration diagram of a fuel cell system according to an embodiment of the present disclosure.

FIG. 2 is a configuration diagram of a fuel cell system including a fuel processing apparatus according to an embodiment of the present disclosure. Other embodiments and configurations may also be provided.

The fuel cell system 1 may include a fuel processing unit I, a power generation unit II, a cooling water circulation unit III, and/or a heat recovery unit IV. The fuel cell system 1 may include a power transform unit including a power transform apparatus that transforms DC power generated by the power generation unit II into AC power.

The fuel processing unit I may include the fuel processing apparatus 10 (or fuel processor), a fuel valve 30 controlling a flow of the fuel gas supplied to the fuel processing apparatus 10, a first blower 71 that makes the air flow to the fuel processing apparatus 10, etc.

The power generation unit II may include stacks 20a and 20b, a reforming gas heat exchanger 21 in which the heat exchange of the reforming gas discharged from the fuel processing apparatus 10 occurs, an AOG heat exchanger 22 in which heat exchange of gas discharged without reacting in the stacks 20a and 20b occurs, a humidifying device 23 for supplying moisture to air to be supplied to the stacks 20a and 20b, a second blower 72 that makes (or pumps) the air flow to the stacks 20a and 20b, etc. The gas discharged without reacting in the stacks 20a and 20b may be referred to as anode off gas (AOG). In an embodiment of the present disclosure, it is described that the fuel cell system 1 includes two stacks 20a and 20b, but the present disclosure is not limited thereto.

The cooling water circulation unit III may include a water supply tank 13 for storing the water generated by the fuel cell system 1, a water pump 38 for making (or pumping) the water flow to the fuel processing apparatus 10, a water supply valve 39 for controlling the flow of the water to be supplied to the fuel processing apparatus 10, a cooling water pump 43 for making (or pumping) the water flow to the reforming gas heat exchanger 21, etc.

The heat recovery unit IV may include a heat recovery tank 15 for storing the water used for the heat exchange, a hot water pump 48 for making (or pumping) the water stored in the heat recovery tank 15 to flow to the outside of the heat recovery tank 15, etc. The water stored in the heat recovery tank 15 may be referred to as hot water. The heat recovery tank 15 is connected to a hot water use place in which the hot water is used (such as a home, etc.) to supply the hot water according to a need of a user.

The fuel cell system 1 may include a waste heat recovery unit for heating the water stored in the water supply tank 13 or the hot water stored in the heat recovery tank 15 by recovering the waste heat of the fuel processing apparatus 10. A detailed description for a configuration and a connection relationship of the waste heat recovery unit 400 may now be provided.

The fuel valve 30 may be disposed in (or on) a fuel supply path 101 in which the fuel gas to be supplied to the fuel processing apparatus 10 flows. In response to an opening level of the fuel valve 30, a flow amount of the fuel gas may be controlled. For example, the fuel valve 30 may block the fuel supply path 101 so as to stop the supply of the fuel gas to the fuel processing apparatus 10.

A first fuel flowmeter 51 for detecting the flow amount of the fuel gas which flows in the fuel supply path 101 may be disposed in (or on) the fuel supply path 101.

The first blower 71 may be connected to a first external air introduction path 201 and a fuel-side air supply path 202. The first blower 71 may make air introduced from the outside through the first external air introduction path 201 flow to the fuel processing apparatus 10 through the fuel-side air supply path 202.

The air introduced into the fuel processing apparatus 10 through the fuel-side air supply path 202 may be supplied to the burner 120 of the fuel processing apparatus 10. For example, the air introduced into the fuel processing apparatus 10 may be mixed with the fuel gas discharged from the desulfurizer 110 in the first mixer 111 and supplied to the burner 120.

An air filter 91 for removing a foreign substance (such as dust included in the air) and/or an air-side check valve 81 for limiting a flow direction of the air may be disposed in (or on) the first external air introduction path 201.

The fuel processing unit I may include a first internal gas path 102 through which the fuel gas discharged from the desulfurizer 110 flows to the reformer 140. In (or on) the first internal gas path 102, the following components may be provided: a proportional control valve 31, an internal fuel valve 32 for controlling the flow of the exhaust gas introduced into the reformer 140, a second fuel flowmeter 52 for detecting a flow amount of the fuel gas which flows in the internal gas path 102, a fuel-side check valve 83 for limiting a flow direction of the fuel gas which flows in the internal gas path 102, and/or a sulfur detection device 94.

The proportional control valve 31 may control the flow amount, the pressure, etc., of the fuel gas which is discharged from the desulfurizer 110 and flows to the reformer 140 through an internal/external feedback by an electrical control scheme.

The sulfur detection device 94 may detect sulfur included in the fuel gas discharged from the desulfurizer 110. The sulfur detection device 94 may include an indicator of which color is changed in reaction with a sulfur compound which is not removed by the adsorbent of the desulfurizer 110. The indicator may include phenolphthalein, a molybdenum compound, etc.

The fuel processing unit I may include a second internal gas path 103 through which the fuel gas discharged from the desulfurizer 110 flows to the burner 120. The burner 120 may use the fuel gas introduced through the second internal gas path 103 for combustion.

The first internal gas path 102 and the second internal gas path 103 may be in communication with each other.

The fuel processing apparatus 10 may be connected to a water supply path 303 in which the water discharged from the water supply tank 13 flows. In (or on) the water supply path 303 the following components may be provided: a water pump 38, a water supply valve 39 for controlling the flow of the water, and/or a water flowmeter 54 for detecting the flow amount of the water which flows in the water supply path 303.

The exhaust gas generated by the burner 120 of the fuel processing apparatus 10 may be discharged from the fuel processing apparatus 10 through an exhaust gas discharge path 210.

The fuel processing apparatus 10 may be connected to a reforming gas discharge path 104. The reforming gas discharged from the fuel processing apparatus 10 may flow through the reforming gas discharge path 104.

The reforming gas discharge path 104 may be connected to the reforming gas heat exchanger 21 in which the heat exchange of the reforming gas occurs. A reforming gas valve 33 for controlling the flow of the reforming gas introduced into the reforming gas heat exchanger 21 may be disposed in (or on) the reforming gas discharge path 104.

The reforming gas discharge path 104 may be in communication with a bypass path 105 through which the reforming gas discharged from the fuel processing apparatus 10 flows to the fuel processing apparatus 10. The bypass path 105 may be connected to the fuel processing apparatus 10. The reforming gas introduced into the fuel processing apparatus 10 through the bypass path 105 may be used as fuel for the combustion of the burner 120. A bypass valve 34 for controlling the flow of the reforming gas introduced into the fuel processing apparatus 10 may be disposed in (or on) the bypass path 105.

The reforming gas heat exchanger 21 may be connected to the reforming gas discharge path 104 in which the reforming gas discharged from the fuel processing apparatus 10 flows. The reforming gas heat exchanger 21 may be connected to a cooling water supply path 304 in which the water discharged from the water supply tank 13 flows. The reforming gas heat exchanger 21 may exchange heat between the reforming gas (introduced through the reforming gas discharge path 104) and the water (supplied through the cooling water supply path 304).

In (or on) the cooling water supply path 304, a cooling water pump 43 for making (or pumping) the water stored in the water supply tank 13 to flow to the reforming gas heat exchanger 21 and/or a cooling water flowmeter 56 for detecting the flow amount of the water which flows in the cooling water supply path 304 may be disposed.

The reforming gas discharge path 104 may be connected to a stack gas supply path 106. The reforming gas discharged from the reforming gas heat exchanger 21 may flow to the stacks 20a and 20b through the stack gas supply path 106.

A reforming gas moisture removing device 61 for controlling an amount of moisture included in the reforming gas may be disposed in (or on) the stack gas supply path 106. The reforming gas introduced into the reforming gas moisture removing device 61 may be discharged from the reforming gas moisture removing device 61 after the moisture is removed.

Condensed water generated by the removing gas moisture removing device 61 may be discharged from the removing gas moisture removing device 61 and flow to a first water recovery path 309. A first water recovery valve 44 for controlling the flow of the water may be disposed in (or on) the first water recovery path 309.

The stacks 20a and 20b may incur the electrochemical reaction in the reforming gas introduced through the stack gas supply path 106 to generate or provide the electric energy. In an embodiment, when the fuel cell system 1 includes a plurality of stacks 20a and 20b, the reforming gas discharged without reacting in the first stack 20a may incur the electrochemical reaction in the second stack 20b.

The second blower 72 may be connected to a second external air introduction path 203 which is in communication with the first external air introduction path 201, and a stack-side air introduction path 204. The second external air introduction path 203 may be connected to a rear end of an air filter 91. The second blower 72 may make the air introduced through the second external air introduction path 203 flow to the stack 20 side through the stack-side air introduction path 204.

A second air-side check valve 82 for limiting the flow direction of the air may be disposed in (or on) the second external air introduction path 203.

An air flowmeter 53 for detecting the flow amount of the air which flows in the stack-side air introduction path 204 may be disposed in (or on) the stack-side air introduction path 204.

The humidifying device 23 may supply the moisture to the air introduced through the stack-side air introduction path 204, and discharge the air including the moisture through the stack-side air supply path 205.

A stack-side air supply valve 36 for controlling the flow of the air to be supplied to the stack 20 may be disposed in (or on) the stack-side air introduction path 205.

The stack-side air supply path 205 may be connected to individual supply paths 206 and 207 corresponding to the stacks 20a and 20b, respectively. The air which flows through the stack-side air supply path 205 may be supplied to the stacks 20a and 20b through the individual supply paths 206 and 207.

The plurality of stacks 20a and 20b may be connected to each other by a gas connection path 107. The reforming gas discharged without reacting in the first stack 20a may be introduced into the second stack 20b through the gas connection path 107.

An additional moisture removing device 62 for removing the water condensed and generated while the reforming gas passes through the first stack 20a may be disposed in (or on) the gas connection path 107.

The water generated by the additional moisture removing device 62 may be discharged from the additional moisture removing device 62 and flow to a second water recovery path 310. A second water recovery valve 45 for controlling the flow of the water may be disposed in (or on) the second water recovery path 310. The second water recovery path 310 may be connected to the first water recovery path 309.

The anode off gas (AOG) discharged without reacting in the stacks 20a and 20b may flow through the stack gas discharge path 108.

The AOG heat exchanger 22 may be connected to the stack gas discharge path 108 in which the anode off gas (AOG) discharged from the stacks 20a and 20b flows. The AOG heat exchanger 22 may be connected to a hot water supply path 313 in which the water discharged from the heat recovery tank 15 flows. The AOG heat exchanger 22 may exchange heat between the anode off gas (AOG) (introduced through the stack gas discharge path 108) and the water (supplied through the hot water supply path 313).

In the hot water supply path 313, a hot water pump 48 for making (or pumping) the water stored in the heat recovery tank 15 flow to the AOG heat exchanger 22 and/or a hot water flowmeter 55 for detecting the flow amount of the water which flows in the hot water supply path 313 may be disposed.

The AOG heat exchanger 22 may be connected to an AOG supply path 109, and discharge the anode off gas (AOG) of which heat is exchanged through the AOG supply path 109. The AOG discharged from the AOG heat exchanger 22 may flow to the fuel processing apparatus 10 through the AOG supply path 109. The AOG supplied to the fuel processing apparatus 10 through the AOG supply path 109 may be used as the fuel for the combustion of the burner 120.

An AOG moisture removing device 63 for controlling the amount of moisture included in the AOG and/or an AOG valve 35 for controlling the flow of the AOG supplied to the fuel processing apparatus 10 may be disposed in (or on) the AOG supply path 109. The AOG introduced into the AOG moisture removing device 63 may be discharged from the AOG moisture removing device 63 after the moisture is removed.

Condensed water generated by the AOG moisture removing device 63 may be discharged from the AOG moisture removing device 63 and flow to a third water recovery path 311. A third water recovery valve 46 for controlling the flow of the water may be disposed in (or on) the third water recovery path 311. The third water recovery path 311 may be connected to the first water recovery path 309.

The stack-side air discharge path 211 may be connected to individual discharge paths 208 and 209 corresponding to the stacks 20a and 20b, respectively. The air discharged from the stacks 20a and 20b may flow to the stack-side air discharge path 211 through the individual discharge paths 208 and 209. In this example, the air which flows through the stack-side air discharge path 211 may include moisture generated by the electrochemical reaction which occurs in the stacks 20a and 20b.

The stack-side air discharge path 211 may be connected to the humidifying device 23. The humidifying device 23 may supply the moisture to the air which flows to the stack 20 by using the moisture include in the air supplied through the stack-side air discharge path 211. The air supplied to the humidifying device 23 through the stack-side air discharge path 211 may be discharged to a humidifying device discharge path 212 via the humidifying device 23.

A stack-side air discharge valve 37 for controlling the flow of the air discharged from the stacks 20a and 20b and introduced into the humidifying device 23 may be disposed in (or on) the stack-side air discharge path 211.

The water supply tank 13 may be connected to the water introduction path 301 and store the water supplied through the water introduction path 301. In the water introduction path 301, a first liquid filter 92 for removing a foreign substance included in water supplied from the outside and/or a water introduction valve 41 for controlling the flow of the water introduced into the water supply tank 13 may be disposed.

The water supply tank 13 may be connected to a water discharge path 302 and discharge at least some of the water stored in the water supply tank 13 through the water discharge path 302. A water discharge valve 42 for controlling the flow of the water discharged from the water supply tank 13 may be disposed in (or on) the water discharge path 302.

The water supply tank 13 may be connected to a water storage path 308 and store water which flows through the water storage path 308. For example, the water which is discharged from the reforming gas moisture removing device 61, the additional moisture removing device 62, the AOG moisture removing device 63, and/or the air moisture removing device 64, and flows through the third water recovery path 311 may be introduced into the water supply tank 13 via the water storage path 308. A second liquid filter 93 for removing a foreign substance included in the water recovered to the water supply tank 13 may be disposed in (or on) the water storage path 308.

At least some of the water stored in the water supply tank 13 may flow to the reforming gas heat exchanger 21 by a cooling water pump 43, and exchange heat with the reforming gas in the reforming gas heat exchanger 21. The water discharged from the reforming gas heat exchanger 21 may be introduced into the stacks 20a and 20b through a stack water supply path 305.

The water introduced into the stacks 20a and 20b through the stack water supply path 305 may cool the stacks 20a and 20b. The water introduced into the stacks 20a and 20b may flow along a stack heat exchanger included in the stacks 20*a* and 20*b*, and absorb the heat generated by the electrochemical reaction which occurs in the stacks 20*a* and 20*b*.

The plurality of stacks 20*a* and 20*b* may be connected to each other by a water connection path 306. The water discharged from the first stack 20*a* may be introduced into the second stack 20*b* through the water connection path 306.

The water discharged from the stacks 20*a* and 20*b* may be introduced into a cooling water heat exchanger 24 through a stack water discharge path 307. The cooling water heat exchanger 24 may exchange heat between the water discharged from the stacks 20*a* and 20*b*, and the water discharged from the heat recovery tank 15. The water discharged from the stacks 20*a* and 20*b* may flow to the water storage path 308 via the cooling water heat exchanger 24.

The water discharged from the heat recovery tank 15 by the hot water pump 48 may be introduced into the AOG heat exchanger 22 via the hot water supply path 313. The water which exchanges heat with the AOG in the AOG heat exchanger 22 may be discharged to a first hot water circulation circuit 314.

An air heat exchanger 25 may be connected to the humidifying device discharge path 212 in which the air discharged from the humidifying device 23 flows. The air heat exchanger 25 may be connected to the first hot water circulation circuit 314 in which the water discharged from the AOG heat exchanger 22 flows. The air heat exchanger 25 may exchange heat between the air (introduced through the humidifying device discharge path 212) and the water (introduced through the first hot water circulation circuit 314).

The air which is heat exchanged in the air heat exchanger 25 may be discharged from the air heat exchanger 25 through an air discharge path 213. The air discharge path 213 may be in communication with the exhaust gas discharge path 210, and the exhaust gas which flows in the exhaust gas discharge path 210 and the air which flows in the air discharge path 213 may be mixed.

The air moisture removing device 64 may be disposed in (or on) the air discharge path 213. The air moisture removing device 64 may control the amount of the moisture included in the air discharged to the outside. The air introduced into the air moisture removing device 64 may be discharged from the air moisture removing device 64 after the moisture is removed.

Condensed water generated by the air moisture removing device 64 may be discharged from the air moisture removing device 64 and flow to a fourth water recovery path 312. The fourth water recovery valve 47 for controlling the flow of the water may be disposed in the fourth water recovery path 312. The fourth water recovery path 312 may be connected to the water storage path 308.

The water of which heat is exchanged in the air heat exchanger 25 may be discharged from the air heat exchanger 25 through a second hot water circulation path 315. The water discharged from the air heat exchanger 25 may be introduced into the cooling water heat exchanger 24 through the second hot water circulation path 315.

The cooling water heat exchanger 24 may exchange heat between the water introduced through the stack water discharge path 307 and the water introduced through the second hot water circulation circuit 315.

An exhaust heat exchanger 26 may be connected to the exhaust gas discharge path 210 in which the exhaust gas flows. The exhaust heat exchanger 26 may be connected to the third hot water circulation circuit 314 in which the water discharged from the cooling water heat exchanger 24 flows. The exhaust heat exchanger 26 may exchange heat between the exhaust gas (introduced through the exhaust gas discharge path 210) and the water (introduced through the third hot water circulation circuit 316).

The exhaust gas of which heat is exchanged in the exhaust heat exchanger 26 may be discharged to an exhaust path 214, and the exhaust gas which flows in the exhaust path 214 may be discharged to the outside.

The water of which heat is exchanged in the exhaust heat exchanger 26 may be discharged to the hot water recovery path 317, and the water which flows in the hot water recovery path 317 may be introduced into the heat recovery tank 15.

Figure 3:
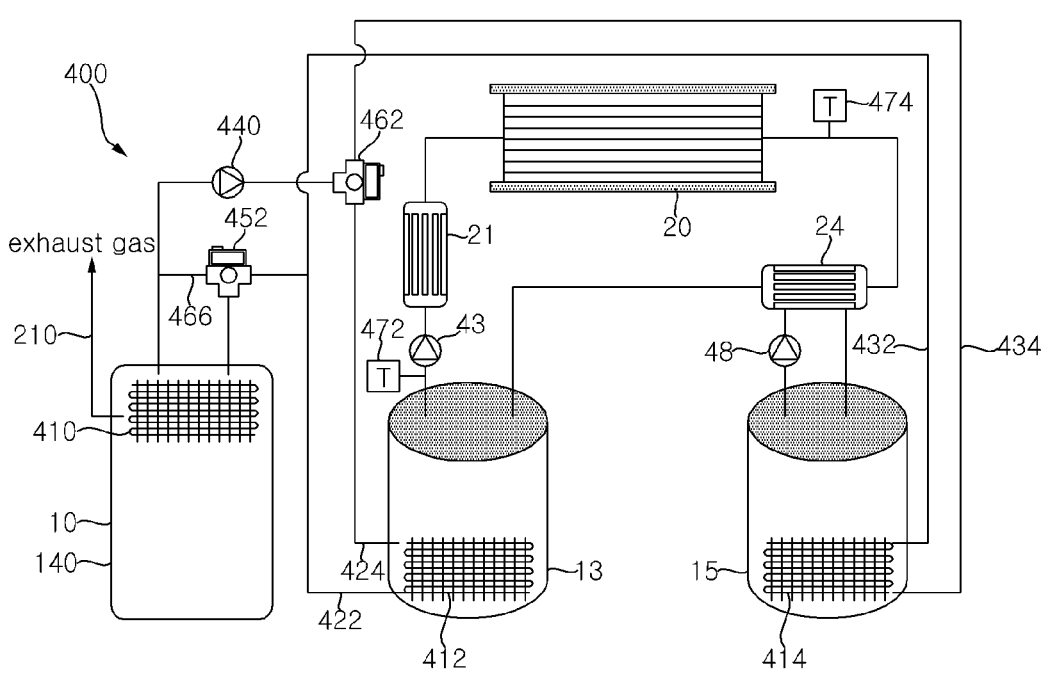
FIG. 3 is a systematic diagram illustrating a fuel processing apparatus, a stack, a water supply tank, a heat recovery tank, and a waste heat recovery unit according to an embodiment of the present disclosure.

The fuel cell system 1 may include a thermometer (or temperature sensor) for sensing (or determining) a temperature. For example and as shown in FIG. 3, the fuel cell system 1 may include a first thermometer 472 for sensing the temperature of the cooling water stored in the water supply tank 13, and a second thermometer 474 for sensing the temperature of the water discharged from the stacks 20*a* and 20*b*, etc. As an example, the first thermometer 472 may be disposed in the cooling water supply path 304, and may sense the temperature of the water which is discharged from the water supply tank 13 and that flows in the cooling water supply path 304. As another example, the first thermometer 472 may be disposed in the water supply tank 13, and may sense the temperature of the water stored in the water supply tank 13. The second thermometer 474 may be disposed in (or on) the stack water discharge path 307, and may sense the temperature of the water which is discharged from the stack 20 and that flows in the stack water discharge path 307.

The fuel cell system 1 may include at least one controller (or control unit). The controller may include at least one processor. The processor may be a general processor such as a central processing unit (CPU). Of course, the processor may be a dedicated device such as ASIC or another hardware based processor. The controller may be a structural device. The controller may control the components of the fuel cell system.

The controller may control an overall operation of the fuel cell system 1. The controller may be connected to each component provided in the fuel cell system 1, and transmit and/or receive a signal between respective components.

The controller may process the signal received from each component provided in the fuel cell system 1, and transmit a control signal according to a result of processing the signal to each component provided in the fuel cell system 1. For example, the controller may control an opening level of each valve provided in the fuel cell system 1. Further, the controller may switch each valve provided in the fuel cell system 1. The controller may control valves based on temperature (with respect to a set temperature).

FIG. 3 is a systematic diagram illustrating the fuel processing apparatus 10, the stack 20, the water supply tank 13, the heat recovery tank 15, and a waste heat recovery unit 400 in the fuel cell system 1 according to an embodiment of the present disclosure. Other embodiments and configurations may also be provided.

The waste heat recovery unit 400 may recover the waste heat of the exhaust gas that is discharged from the fuel processing apparatus 10 through cooling water which flows along a cooling water line. The waste heat recovery unit 400 may be connected to each of the fuel processing apparatus 10, the water supply tank 13, and the heat recovery tank 15. The waste heat recovery unit 400 may form a cooling water line that circulates through the fuel processing apparatus 10, the water supply tank 13, and the heat recovery tank 15.

The waste heat recovery unit 400 may include a plurality of heat exchangers 410, 412, and 414 disposed in the fuel processing apparatus 10, the water supply tank 13, and the heat recovery tank 15, respectively. The waste heat recovery unit 400 may include a first heat exchanger 410 disposed in the fuel processing apparatus 10, a second heat exchanger 412 disposed in the water supply tank 13, and a third heat exchanger 414 disposed in the heat recovery tank 15.

In the first heat exchanger 410, the exhaust gas discharged from the fuel processing apparatus 10 and the cooling water supplied from the water supply tank 13 or the heat recovery tank 15 may exchange heat. The first heat exchanger 410 may be disposed to be close to an exhaust outlet of the burner 120.

In the second heat exchanger 412, the cooling water (of which heat is exchanged in the first heat exchanger 410) and the water stored in the water supply tank 13 may exchange heat.

In the third heat exchanger 414, the cooling water (of which heat is exchanged in the first heat exchanger 410) and the hot water stored in the heat recovery tank 15 may exchange heat.

The waste heat recovery unit 400 may form the cooling water line, and include first heat recovery pipes 422 and 424 connecting the first heat exchanger 410 and the second heat exchanger 412 and second heat recovery pipes 432 and 434 connecting the first heat exchanger 410 and the third heat exchanger 414. The pipes may also be considered as conduits, channels, paths, etc.

The first heat recovery pipes 422 and 424 may include a $1\text{-}1^{st}$ heat recovery pipe 422 connecting a discharge end of the second heat exchanger 412 and an introduction end of the first heat exchanger 410. The cooling water which exchanges heat with the water stored in the water supply tank 13 may flow in the $1\text{-}1^{st}$ heat recovery pipe 422.

The first heat recovery pipes 422 and 424 may include a $1\text{-}2^{nd}$ heat recovery pipe 424 connecting the introduction end of the second heat exchanger 412 and the discharge end of the first heat exchanger 410. The cooling water which exchanges heat with the exhaust gas of the fuel processing apparatus 10 may flow in the $1\text{-}2^{nd}$ heat recovery pipe 424.

A heat supply pump 440 forming a flow of the cooling water which is circulated in the cooling water line may be disposed in (or on) the $1\text{-}2^{nd}$ heat recovery pipe 424.

The waste heat recovery unit 400 may include a bypass pipe 466 in which cooling water bypassing the first heat exchanger 410 flows. The bypass pipe 466 may be disposed at the first heat exchanger 410 side. The bypass pipe 466 may be connected to an introduction end (recovery pipe 422) of the first heat exchanger 410 and a discharge end (recovery pipe 424) of the first heat exchanger 410.

The second heat recovery pipes 432 and 434 may include a $2\text{-}1^{st}$ heat recovery pipe 432 connecting the discharge end of the third heat exchanger 414 and the introduction end of the first heat exchanger 410. Specifically, the $2\text{-}1^{st}$ heat recovery pipe 432 may be joined to the $1\text{-}1^{st}$ heat recovery pipe 422 and connected to the introduction end of the first heat exchanger 410. Accordingly, the cooling water which exchanges heat with the hot water stored in the heat recovery tank 15 may flow in the $2\text{-}1^{st}$ heat recovery pipe 432.

The second heat recovery pipes 432 and 434 may include a $2\text{-}2^{nd}$ heat recovery pipe 434 connecting the introduction end of the third heat exchanger 414 and the discharge end of the first heat exchanger 410. Specifically, the $2\text{-}2^{nd}$ heat recovery pipe 434 may be branched from the $1\text{-}2^{nd}$ heat recovery pipe 424 and connected to the discharge end of the first heat exchanger 410. Accordingly, the cooling water which exchanges heat with the exhaust gas of the fuel processing apparatus 10 may flow in the $2\text{-}2^{nd}$ heat recovery pipe 434.

The waste heat recovery unit 400 may include a heat recovery valve 452 for supplying the cooling water discharged from the water supply tank 13 or the heat recovery tank 15 to the fuel processing apparatus 10. The heat recovery valve 452 may be controlled by the controller. The heat recovery valve 452 may operate so as for the cooling water discharged from the second heat exchanger 412 to be supplied to the first heat exchanger 410 or bypass the first heat exchanger 410. The heat recovery valve 452 may operate so as for the cooling water discharged from the third heat exchanger 412 to be supplied to the first heat exchanger 410 or bypass the first heat exchanger 410.

The heat recovery valve 452 may be disposed in (or on) the $1\text{-}1^{st}$ heat recovery pipe 422. The heat recovery valve 452 may be constituted by a 3-way valve. The introduction end of the heat recovery valve 452 may be connected to an upstream of the $1\text{-}1^{st}$ heat recovery pipe 422. A first discharge end of the heat recovery valve 452 may be connected to a downstream of the $1\text{-}1^{st}$ heat recovery pipe 422. A second discharge end of the heat recovery valve 452 may be connected to the bypass pipe 466.

The waste heat recovery unit 400 may include a heat supply valve 462 for supplying the cooling water discharged from the fuel processing apparatus 10 to the water supply tank 13 or the heat recovery tank 15. The heat supply valve may be controlled by the controller. The heat supply valve 462 may operate to supply the cooling water discharged from the first heat exchanger 410 to the second heat exchanger 412 or the third heat exchanger 414 or supply the cooling water bypassing the first heat exchanger 410 to the second heat exchanger 412 or the third heat exchanger 414.

The heat supply valve 462 may be disposed in the $1\text{-}2^{nd}$ heat recovery pipe 424. The heat recovery valve 452 may be constituted by the 3-way valve. The introduction end of the heat supply valve 462 may be connected to the upstream of the $1\text{-}2^{nd}$ heat recovery pipe 424. The first discharge end of the heat supply valve 462 may be connected to the downstream of the $1\text{-}2^{nd}$ heat recovery pipe 424. The second discharge end of the heat supply valve 462 may be connected to the $2\text{-}2^{nd}$ heat recovery pipe 434.

The waste heat recovery unit 400 may recover the waste heat of the exhaust gas by exchanging heat between the cooling water which flows along the cooling water lines 422, 424, 432, and 434 with the exhaust gas discharged from the fuel processing apparatus 10, and heat the water stored in the water supply tank 13 by supplying the heat-exchanged cooling water to the water supply tank 13 or heat the hot water stored in the heat recovery tank 15 by supplying the heat exchanged cooling water to the heat recovery tank 15.

Figure 4:
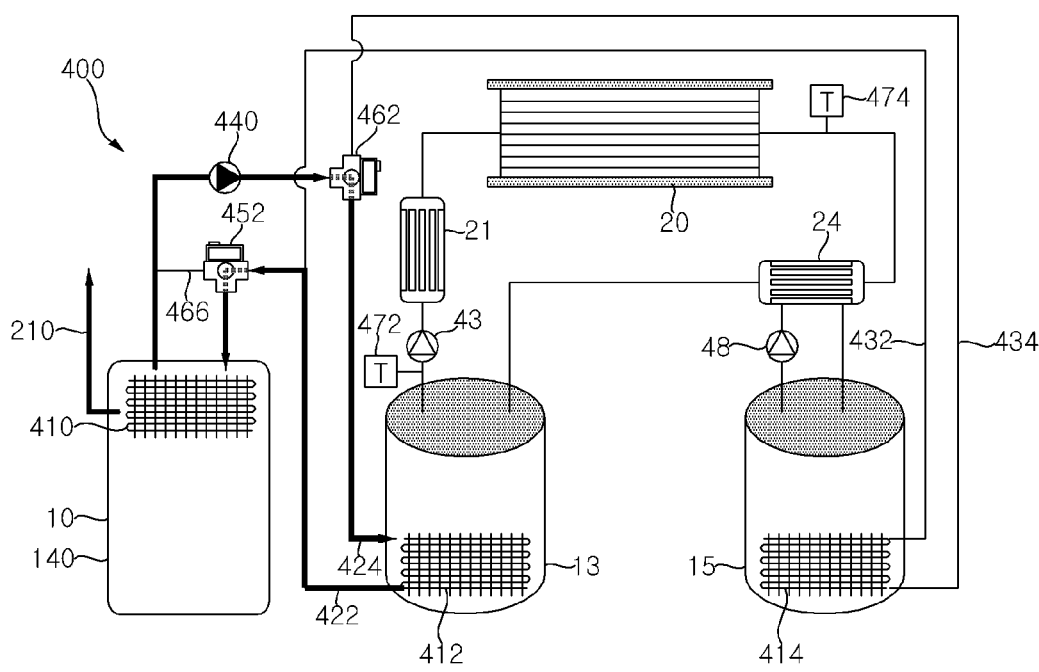
FIGS. 4 and 5 are diagrams for describing that in a warm-up mode and/or a reforming mode of a fuel cell system, waste heat of a fuel processing apparatus is recovered to warm up cooling water stored in a water supply tank according to an embodiment of the present disclosure.
Figure 5:
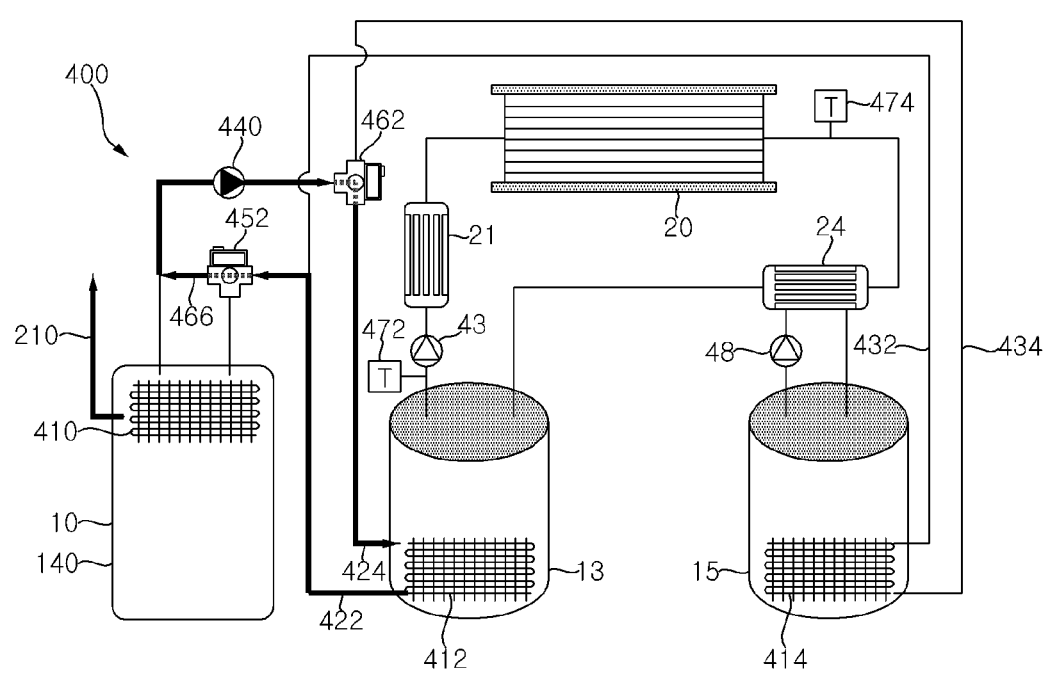

FIGS. 4 and 5 are systematic diagrams for an operation of the waste heat recovery unit 400 in a warm-up mode WM and/or a reforming mode RM of the fuel cell system 1.

The fuel cell system 1 may operate in the warm-up mode WM of warming up the fuel processing apparatus 10 so as to reach a temperature suitable for reforming, and more specifically for warming up the reformer 140 of the fuel processing apparatus 10 with the burner 120. Alternatively, the fuel cell system 1 may operate in the reforming mode RM of recirculating the reforming gas with the burner and repeating reforming so that concentrations of hydrogen and carbon monoxide of the reforming gas reach concentrations suitable for power generation.

In the warm-up mode WM, the fuel cell system 1 may close all of the reforming gas valve 33, the bypass valve 34, and the AOG valve 35. In this example, since the supply of the fuel gas to the reformer 140 is interrupted, the reforming gas is not generated in the reformer 140. Further, the reforming gas or the AOG does not flow in the reforming gas discharge path 104, the bypass path 105, and the AOG supply path 109 (see FIG. 2).

In the reforming mode RM, the fuel cell system 1 may close the reforming gas valve 33 and the AOG valve 35, and open the bypass valve 34. In this example, the reforming gas discharged from the fuel processing apparatus 10 may be introduced into the fuel processing apparatus 10 again through the reforming gas discharge path 104 and the bypass path 105, and used as the fuel for the combustion of the burner 120 (see FIG. 2).

In the warm-up mode WM and/or the reforming mode RM, the fuel cell system 1 operates the heat supply pump 440 to provide the flow of the cooling water circulated in the cooling water lines 422, 424, and 466.

The flow of the cooling water circulated in the cooling water line in order to recover the waste heat of the exhaust gas discharged from the fuel processing apparatus 10 may now be described.

Referring to FIG. 4, the cooling water discharged from the second heat exchanger 412 may be supplied to the heat recovery valve 452 while flowing along the upstream of the 1-1$^{st}$ heat recovery pipe 422. In this example, the heat recovery valve 452 may be switched to the first heat exchanger 410 side (or output to the first heat exchanger) so as to be connected to the downstream of the 1-1$^{st}$ heat recovery pipe 422, and the cooling water supplied to the heat recovery valve 452 may be supplied to the first heat exchanger 410 while flowing along the downstream of the 1-1$^{st}$ heat recovery pipe 422.

The cooling water supplied to the first heat exchanger 410 may be discharged after exchanging heat with the exhaust gas discharged after the combustion according to the operation of the burner 140, and supplied to the heat supply valve 462 through the heat supply pump 440 while flowing along the upstream of the 1-2$^{nd}$ heat recovery pipe 424. In this example, the heat supply valve 462 may be switched to the second heat exchanger 412 side (or output to the second heat exchanger) so as to be connected to the downstream of the 1-2$^{nd}$ heat recovery pipe 424, and the cooling water supplied to the heat recovery valve 462 may be supplied to the second heat exchanger 412 while flowing along the downstream of 1-2$^{nd}$ heat recovery pipe 424.

The cooling water supplied to the second heat exchanger 412 may be discharged after exchanging heat with the water stored in the water supply tank 13, and the cooling water discharged from the second heat exchanger 412 may be circulated in the cooling water line according to the above-described circulation cycle.

As a result, in the warm-up mode WM and/or the reforming mode RM, the water stored in the water supply tank 13 may exchange heat with the cooling water recovering the waste heat wasted from the exhaust gas through the first heat exchanger 410, and may be heated in the second heat exchanger 410.

The flow of the cooling water circulated in the cooling water line when the recovery of the waste heat of the exhaust gas discharged from the fuel processing apparatus 10 is completed may be described.

Referring to FIG. 5, the cooling water discharged from the second heat exchanger 412 may be supplied (or provided) to the heat recovery valve 452 while flowing along the upstream of the 1-1$^{st}$ heat recovery pipe 422. In this example, the fuel cell system 1 may sense the temperature of the water stored in the water supply tank 13 through the first thermometer 472, and when a water temperature value (or temperature) sensed by the first thermometer 472 is equal to or more than a first set temperature, the fuel cell system 1 may switch the heat recovery valve 452 to be connected to the bypass pipe 466 (or control the heat recovery valve 452 to open to the bypass pipe 466). The first set temperature as a water temperature suitable for sufficiently warming up the stack 20 in a power generation mode PM may be a value prestored in a memory of the controller, or other memory.

The cooling water supplied to the heat recovery valve 452 may be supplied to the heat supply valve 462 through the heat supply pump 440 while flowing along the bypass pipe 466 and the downstream of the 1-2$^{nd}$ heat recovery pipe 424. In this example, the heat supply valve 462 may be switched to the second heat exchanger 412 side (or output to the second heat exchanger) so as to be connected to the downstream of the 1-2$^{nd}$ heat recovery pipe 424, and the cooling water supplied to the heat recovery valve 462 may be supplied to the second heat exchanger 412 while flowing along the downstream of the 1-2$^{nd}$ heat recovery pipe 424.

The cooling water supplied to the second heat exchanger 412 may be discharged after exchanging heat with the water stored in the water supply tank 13, and the cooling water discharged from the second heat exchanger 412 may be subjected to the circulation process in the same manner.

As a result, when the temperature of the water stored in the water supply tank 13 is sufficiently raised, the recovery of the waste heat of the fuel processing apparatus 10 may be terminated by bypassing the cooling water to be supplied to the fuel processing apparatus 10 and the temperature of the water stored in the water supply tank 13 may be kept to a set temperature suitable for warming up the stack.

Figure 6:
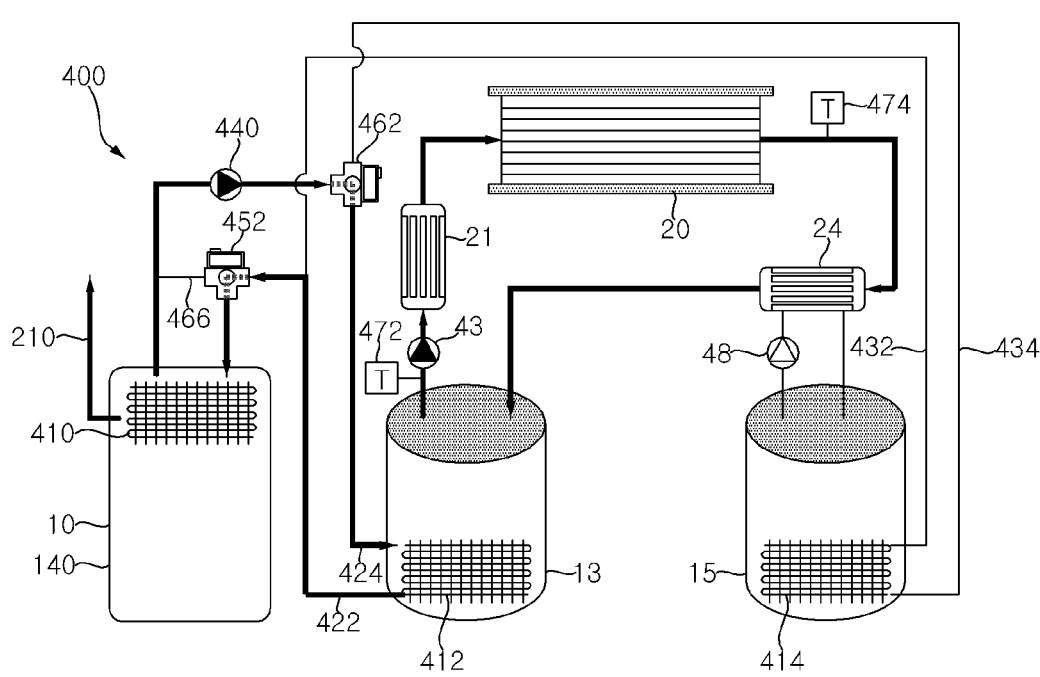
FIGS. 6 and 7 are diagrams for describing that in a power generation mode of the fuel cell system, the waste heat of the fuel processing apparatus is recovered to heat hot water stored in a heat recovery tank according to an embodiment of the present disclosure.
Figure 7:
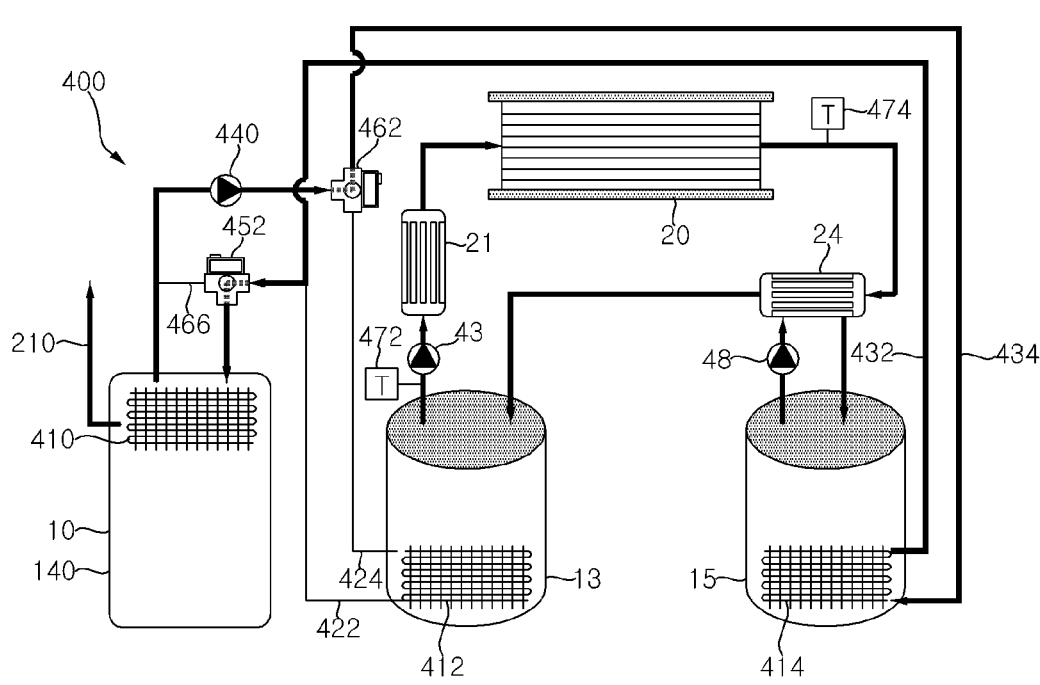

FIGS. 6 and 7 are systematic diagrams for operation of the fuel cell system 1 in the power generation mode PM of the fuel cell system 1.

The fuel cell system 1 may operate in the power generation mode PM of generating (or providing) electricity in the stacks 20a and 20b based on the electrochemical reaction of the air and the reforming gas.

In the power generation mode PM, the fuel cell system 1 may open the reforming gas valve 33 and close the bypass valve 34 so as to supply the reforming gas discharged from the fuel processing apparatus 10 to the stack 20. The fuel cell system 1 may supply the air used for the electrochemical reaction of generating the electricity to the stack 20 by driving the second blower 72 (see FIG. 2).

In the power generation mode PM, the fuel cell system 1 operates the heat supply pump 440 to provide the flow of the cooling water circulated in the cooling water lines 422, 424, 432, and 434.

In the power generation mode PM, the fuel cell system 1 operates the cooling water pump 43 to provide the water flow by supplying the water stored in the water supply tank 13 to the stack 20.

The flow of the cooling water for warming up the stack 20 at an initial stage of the power generation mode PM may now be described.

Referring to FIG. 6, the cooling water discharged from the second heat exchanger 412 may be supplied to the heat recovery valve 452 while flowing along the upstream of the 1-1$^{st}$ heat recovery pipe 422. In this example, the heat recovery valve 452 may be switched to the first heat exchanger 410 side (or output to the first heat exchanger) so as to be connected to the downstream of the 1-1$^{st}$ heat recovery pipe 422, and the cooling water supplied to the heat recovery valve 452 may be supplied to the first heat exchanger 410 while flowing along the downstream of the 1-1$^{st}$ heat recovery pipe 422.

The cooling water supplied to the first heat exchanger 410 may be discharged after exchanging heat with the exhaust gas discharged after the combustion according to the operation of the burner 140, and supplied to the heat supply valve 462 through the heat supply pump 440 while flowing along the upstream of the 1-2$^{nd}$ heat recovery pipe 424. In this example, the heat supply valve 462 may be switched to the second heat exchanger 412 side (or output to the second heat exchanger) so as to be connected to the downstream of the 1-2$^{nd}$ heat recovery pipe 424, and the cooling water supplied to the heat recovery valve 462 may be supplied to the second heat exchanger 412 while flowing along the downstream of the 1-2$^{nd}$ heat recovery pipe 424.

As a result, the water stored in the water supply tank 13 exchanges heat with the cooling water (recovering the waste heat wasted from the exhaust gas) through the first heat exchanger 410 to be heated in the second heat exchanger 412, and the heated water stored in the water supply tank 13 may be supplied to the stack 20 by operating the cooling water pump 43 to quickly warm up the stack 20 at a temperature suitable for the power generation at the initial stage of the power generation mode PM. As a result, power generation efficiency of the stack 20 may be enhanced.

In the power generation mode PM, the fuel cell system 1 may sense the temperature of the water discharged to the stack 20 through the second thermometer 474. When the water temperature value (or temperature) sensed by the second thermometer 474 is equal to or more than a second set temperature, the fuel cell system 1 may judge that the warm-up of the stack 20 is completed. The second set temperature as a temperature at which a normal power generation operation is enabled as the warm-up of the stack 20 is sufficiently completed in the power generation mode PM may be the value prestored in the memory of the controller, or other memory.

The flow of the cooling water at a middle stage of the power generation mode PM in which the warm-up of the stack 20 is completed may now be described.

Referring to FIG. 7, the cooling water discharged from the third heat exchanger 414 may be supplied to the heat recovery valve 452 while flowing along the 2-1$^{st}$ heat recovery pipe 432. In this example, the heat recovery valve 452 may be switched to the first heat exchanger 410 side (or output to the first heat exchanger) so as to be connected to the downstream of the 1-1$^{st}$ heat recovery pipe 422, and the cooling water supplied to the heat recovery valve 452 may be supplied to the first heat exchanger 410 while flowing along the downstream of the 1-1$^{st}$ heat recovery pipe 422.

The cooling water supplied to the first heat exchanger 410 may be discharged after exchanging heat with the exhaust gas discharged after the combustion according to the operation of the burner 140, and supplied to the heat supply valve 462 through the heat supply pump 440 while flowing along the upstream of the 1-2$^{nd}$ heat recovery pipe 424. In this example, the heat supply valve 462 may be switched to the third heat exchanger 414 side (or output to the third heat exchanger) so as to be connected to the 2-2$^{nd}$ heat recovery pipe 434, and the cooling water supplied to the heat recovery valve 462 may be supplied to the third heat exchanger 414 while flowing along the 2-2$^{nd}$ heat recovery pipe 434.

As a result, when the warm-up of the stack 20 is completed, the hot water stored in the heat recovery tank 15 exchanges heat with the cooling water recovering the waste heat wasted from the exhaust gas through the first heat exchanger 410 to be heated in the third heat exchanger 414, and the hot water stored in the heat recovery tank 15 may be supplied to the hot water use place (such as the home, etc.) according to the need of the user. As a result, a waste heat recovery amount wasted from the fuel processing apparatus 10 may be increased, and total energy efficiency of the fuel cell system 1 may be enhanced.

In the power generation mode PM, the fuel cell system 1 may operate the hot water pump 48 so that the water discharged from the stack 20 through the cooling water heat exchanger 24 and the hot water circulated in the heat recovery tank 15 exchange heat with each other.

Figure 8:
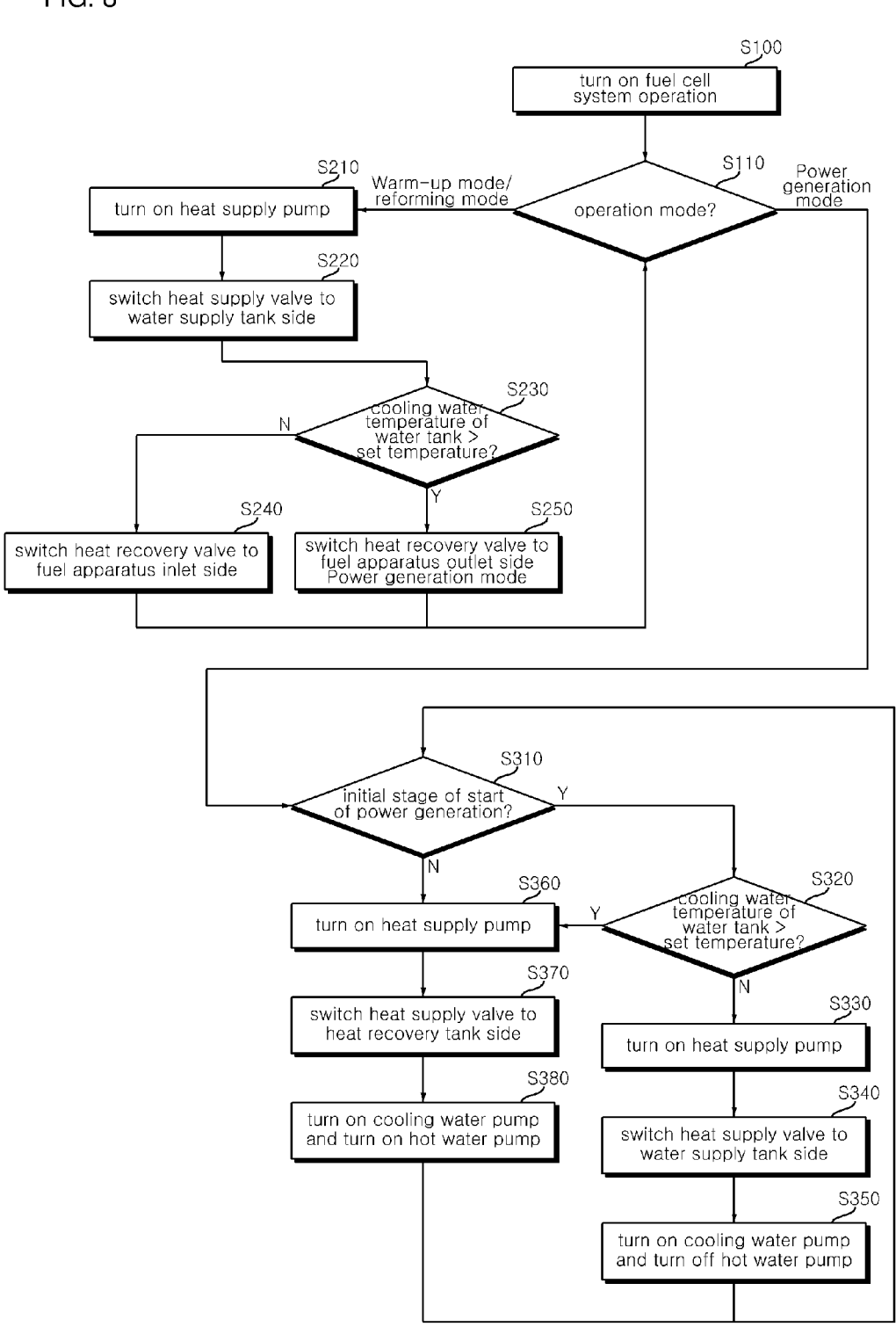
FIG. 8 is a flowchart for a control method of a fuel cell system according to an embodiment of the present disclosure.

FIG. 8 is a flowchart for a control method of a fuel cell system 1 according to an embodiment of the present disclosure.

Referring to FIG. 8, the controller may initiate the operation of the fuel cell system 1 (S100). After the operation of the fuel cell system 1 is initiated, the fuel cell system 1 may perform a warm-up operation WM, a reforming operation RM, and/or a power generation operation PM.

After S100, the controller may judge a current operation mode of the fuel cell system 1 (S110).

When the current operation mode of the fuel cell system 1 is the warm-up mode WM or the reforming mode RM, the controller may operate the heat supply pump 440 (S210). As a result, the flow of the cooling water circulated along the cooling water line to the waste heat recovery unit 400 may be formed.

After S210, the controller may switch the heat supply valve 462 to the water supply valve 13 side so that the cooling water which exchanges heat with the exhaust gas in the first heat exchanger 410 is supplied to the second heat exchanger 412 (S220). In this example, the controller may switch the heat recovery valve 452 to the fuel processing apparatus 10 side so that the cooling water discharged from the second heat exchanger 412 is supplied to the first heat exchanger 410. Accordingly, the cooling water circulated in the cooling water line recovers the waste heat of the exhaust gas in the first heat exchanger 410, and then is supplied to the second heat exchanger 412, and the cooling water supplied to the second heat exchanger 410 and the water stored in the water supply tank 13 exchange heat, and as a result, the water stored in the water supply tank 133 may be heated.

After S220, the controller may judge whether warm-up of the water stored in the water supply tank 13 is completed (S230). Specifically, the controller may sense the temperature of the water stored in the water supply tank 13 through the first thermometer 472, and when the water temperature value sensed by the first thermometer 472 is equal to or more than a first set temperature, the controller may judge that the warm-up of the water stored in the water supply tank 13 is completed. The first set temperature may be set to a water temperature suitable for sufficiently warming up the stack 20 in the power generation mode PM.

When the warm-up of the water stored in the water supply tank 13 is not completed (No in S230), the controller may switch the heat recovery valve 452 to an inlet end 422 side of the fuel processing apparatus 10 so that the cooling water discharged from the second heat exchanger 412 is supplied to the first heat exchanger 410. Accordingly, the cooling water circulated in the cooling water line may recover the waste heat of the exhaust gas in the first heat exchanger 410 until the temperature of the water in the water supply tank 13 reaches the first set temperature.

When the warm-up of the water stored in the water supply tank 13 is completed (Yes in S230), the controller may switch the heat recovery valve 452 to an outlet end 424 side of the fuel processing apparatus 10 so that the cooling water discharged from the second heat exchanger 412 bypasses the first heat exchanger 410 (S250). Accordingly, the cooling water circulated in the cooling water line may maintain the temperature of the water stored in the water supply tank 13 by not recovering the waste heat of the exhaust gas any longer in the first heat exchanger 410.

After S240 and S250, the controller returns to S110 to judge the current operation mode of the fuel cell system 1 again.

When the current operation mode of the fuel cell system 1 is the power generation mode PM, the controller may judge whether the power generation mode PM is an initial state (S310). As an example, the controller may judge whether the power generation mode PM is in the initial state by considering whether the warm-up of the stack 20 is completed. Specifically, the controller may sense the temperature of the water discharged to the stack 20 through the second thermometer 474, and when the water temperature value sensed by the second thermometer 474 is equal to or more than a second set temperature, the controller may judge that the warm-up of the stack 20 is completed and judge that the current power generation mode PM corresponds to the middle stage. The second set temperature may be set to a temperature at which the normal power generation operation is enabled as the warm-up of the stack 20 is sufficiently completed in the power generation mode PM.

When the power generation mode PM is the initial state (Yes in S310), the controller may judge whether the warm-up of the water stored in the water supply tank 13 is completed (S320). Specifically, the controller may sense the temperature of the water stored in the water supply tank 13 through the first thermometer 472, and when the water temperature value sensed by the first thermometer 472 is equal to or more than a first set temperature, the controller may judge that the warm-up of the water stored in the water supply tank 13 is completed.

When the warm-up of the water stored in the water supply tank 13 is not completed (No in S320), the controller may operate the heat supply pump 440 (S330). As a result, the flow of the cooling water circulated along the cooling water line to the waste heat recovery unit 400 may be formed.

After S330, the controller may switch the heat supply valve 462 to the water supply tank 13 side so that the cooling water which exchanges heat with the exhaust gas in the first heat exchanger 410 is supplied to the second heat exchanger 412 (S340). In this example, the controller may switch the heat recovery valve 452 to the fuel processing apparatus 10 side so that the cooling water discharged from the second heat exchanger 412 is supplied to the first heat exchanger 410. Accordingly, the cooling water circulated in the cooling water line recovers the waste heat of the exhaust gas in the first heat exchanger 410, and then is supplied to the second heat exchanger 412, and the cooling water supplied to the second heat exchanger 412 and the water stored in the water supply tank 13 exchange heat, and as a result, the water stored in the water supply tank 133 may be heated.

After S340, the controller may operate the cooling water pump 43 (S350). Further, the controller may stop the operation of the hot water pump 48 or maintain a stop state (S350). Accordingly, at the initial stage of the power generation mode PM, when the water of the water supply tank 13 supplied to the stack 20 is not sufficiently heated, the waste heat of the exhaust gas recovered from the fuel processing apparatus 10 is not supplied to the heat recovery tank 15 side, but concentratedly supplied to the water supply tank 13 side and the water of the water supply tank 13 is supplied to warm up the stack 20.

When the warm-up of the water stored in the water supply tank 13 is completed (Yes in S320), the controller may proceed to an operation of S360 to be described below.

When the power generation mode PM is the middle stage (No in S310), the controller may operate the heat supply pump 440 (S360). As a result, the flow of the cooling water circulated along the cooling water line to the waste heat recovery unit 400 may be formed.

After S360, the controller may switch the heat supply valve 462 to the heat recovery tank 15 side so that the cooling water which exchanges heat with the exhaust gas in the first heat exchanger 410 is supplied to the third heat exchanger 412 (S370). In this example, the controller may switch the heat recovery valve 452 to the fuel processing apparatus 10 side so that the cooling water discharged from the third heat exchanger 414 is supplied to the first heat exchanger 410. Accordingly, the cooling water circulated in the cooling water line recovers the waste heat of the exhaust gas in the first heat exchanger 410, and then is supplied to the third heat exchanger 414, and the cooling water supplied to the third heat exchanger 414 and the hot water stored in the heat recovery tank 15 exchange heat, and as a result, the hot water stored in the heat recovery tank 15 may be heated.

After S370, the controller may operate the cooling water pump 43 (S380). Further, the controller may operate the hot water pump 48 or maintain an operation state (S380). Accordingly, at the middle stage of the power generation mode PM, when the stack 20 is sufficiently warmed up, the hot water stored in the heat recovery tank 15 may be heated as the waste heat of the exhaust gas recovered from the fuel processing apparatus 10 is supplied to the heat recovery tank 15 side, and the hot water stored in the heat recovery tank 15 may be supplied to the hot water use place such as the home, etc., according to the need of the user.

The present disclosure provides a fuel cell system that warms up a stack by utilizing waste heat of exhaust gas that is discharged from a fuel processing apparatus.

The present disclosure also provides a fuel cell system that heats hot water supplied to a hot water use place (such as a home, etc.) by utilizing the waste heat of the exhaust gas that is discharged from the fuel processing apparatus.

In an aspect, provided is a fuel cell system which includes: a stack generating power through an electrochemical reaction of reforming gas and air; a fuel processing apparatus generating the reforming gas supplied to the stack; a water supply tank storing the water supplied to the stack; a heat recovery tank storing hot water; a first heat exchanger disposed in the fuel processing apparatus, and exchanging heat between cooling water and exhaust gas discharged from the fuel processing apparatus; and a heat supply valve supplying the cooling water of which heat is exchanged in the first heat exchanger to the water supply tank or the heat recovery tank so as to heat the water stored in the water supply tank or the hot water stored in the heat recovery tank, in which waste heat of the exhaust gas discharged from the fuel processing apparatus is recovered to heat the water stored in the water supply tank or the hot water stored in the heat recovery tank.

The fuel cell system may further include a control unit controlling the heat supply valve, and the control unit switches the heat supply valve to the water supply tank side so as to supply the cooling water of which heat is exchanged in the first heat exchanger to the water supply tank in a warm-up mode of warming up the fuel processing apparatus to warm up the water stored in the water supply tank in the warm-up mode.

The fuel cell system may further include a heat recovery valve supplying the cooling water discharged from the water supply tank to the first heat exchanger or the heat supply valve.

The fuel cell system may further include a control unit controlling the heat supply valve and the heat recovery valve, and the control unit switches the heat recovery valve to the first heat exchanger side so as to supply the cooling water discharged from the water supply tank to the first heat exchanger in the warm-up mode of warming up the fuel processing apparatus to exchange heat between the exhaust gas and the cooling water in the fuel processing apparatus in the warm-up mode.

The fuel cell system may further include a first temperature sensor sensing a temperature of the water stored in the water supply tank, and the control unit switches the heat recovery valve to the heat supply valve side when the water temperature sensed by the first temperature sensor is equal to or more than a first set temperature to judge that the warm-up of the water stored in the water supply tank is completed and stop the recovery of the waste heat in the fuel processing apparatus.

The fuel cell system may include a first temperature sensor sensing the temperature of the water stored in the water supply tank; a second temperature sensor sensing a temperature of water discharged from the stack; and a control unit controlling the heat supply valve, and the control unit switches the heat supply valve to the water supply valve side so as to supply the cooling water which exchanges heat with the exhaust gas in the first heat exchanger to the water supply tank when the water temperature sensed by the first temperature sensor is equal to or more than the first set temperature and the water temperature sensed by the second temperature sensor is less than a second set temperature in a power generation mode of generating the power through the electrochemical reaction of the reforming gas and the air in the stack to heat the water stored in the water supply tank at an initial stage of the power generation mode.

The control unit switches the heat supply valve to the water supply valve side so as to supply the cooling water which exchanges heat with the exhaust gas in the first heat exchanger to the heat recovery tank when the temperature of the cooling water sensed by the second temperature sensor is equal to or more than the second set temperature in the power generation mode of generating the power through the electrochemical reaction of the reforming gas and the air in the stack to heat the hot water stored in the heat recovery tank at a middle stage of the power generation mode.

The first set temperature may be higher than the second set temperature.

The fuel cell system may further include a heat supply pump forming a flow of the cooling water circulated in the fuel processing apparatus, the water supply tank, and the heat recovery tank.

The fuel cell system may further include a cooling water pump disposed between the water supply tank and the stack, and supplying the cooling water stored in the water supply tank to the stack.

The fuel cell system may include a control unit controlling the operation of the cooling water pump, and the control unit operates the cooling water pump so as to supply the cooling water to the stack in the power generation mode of generating the power through the electrochemical reaction of the reforming gas and the air in the stack to warm up the stack.

The fuel cell system may include: a second heat exchanger disposed in the water supply tank, and exchanging heat between the cooling water which exchanges heat with the exhaust in the first heat exchanger and the cooling water stored in the water supply tank; and a third heat exchanger disposed in the heat recovery tank, and exchanging heat between the cooling water which exchanges heat with the exhaust in the first heat exchanger and the hot water stored in the heat recovery tank.

The fuel processing apparatus may further include a burner supplying heat energy required for generating the reforming gas, and the first heat exchanger may be disposed to be close to an outlet side of the burner from which exhaust gas generated after a combustion reaction of fuel is discharged.

According to various embodiments of the present disclosure, there is an effect that waste heat of exhaust gas that is discharged from a burner of a fuel processing apparatus is recovered by cooling water circulated in a waste heat recovery unit, cooling water of a water tank supplied to a stack is heated by the cooling water of the waste heat recover unit, and then supplied to the stack, and as a result, a low temperature-state stack is warmed up and power generation efficiency of a fuel cell system is enhanced.

Further, according to various embodiments of the present disclosure, there is an effect that the waste heat of the exhaust gas that is discharged from the burner of the fuel processing apparatus is recovered by the cooling water circulated in the waste heat recovery unit, and hot water of a heat recovery tank supplied to a hot water use place (such as a home, etc.) is heated by the cooling water of the waste heat recovery unit and total energy efficiency in the fuel cell system is enhanced.

The effects of the present disclosure are not limited to the aforementioned effect, and other effects, which are not mentioned above, will be apparent to a person having ordinary skill in the art from the description of the claims.

It is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Similarly, it may not have to be appreciated that operations are depicted in drawings in a specific order, but the operations should be performed in a specific order or a sequentially order illustrated in order to obtain a preferred result or all illustrated operations should be performed. In a specific case, multi-tasking and parallel processing may be advantageous.

Further, while the preferred embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell system comprising:
a stack configured to provide power based on an electrochemical reaction of reforming gas and air;
a fuel processing apparatus configured to provide the reforming gas to be supplied to the stack;
a water supply tank configured to store the water to be supplied to the stack;
a heat recovery tank configured to store hot water;
a first heat exchanger disposed at the fuel processing apparatus, and configured to exchange heat between cooling water and exhaust gas that is discharged from the fuel processing apparatus, and to provide cooling water based on the exchanged heat; and
a heat supply valve configured to selectively provide the cooling water from the first heat exchanger to the water supply tank so as to heat the water in the water supply tank or to the heat recovery tank so as to heat the hot water in the heat recovery tank,
wherein the fuel cell system further comprises:
a first temperature sensor configured to sense the temperature of the water in the water supply tank;
a second temperature sensor configured to sense a temperature of water discharged from the stack; and
a controller configured to control the heat supply valve, and
wherein the controller controls the heat supply valve to open to the water supply valve and provide the cooling water to the water supply tank when the water temperature sensed by the first temperature sensor is equal to or more than a first set temperature and the temperature sensed by the second temperature sensor is less than a second set temperature in a power generation mode.

2. The fuel cell system of claim 1, wherein the controller is configured to control the heat supply valve to output to the water supply tank and provide the cooling water to the water supply tank in a warm-up mode.

3. The fuel cell system of claim 1, comprising:
a heat recovery valve configured to selectively provide the cooling water discharged from the water supply tank to the first heat exchanger or to the heat supply valve.

4. The fuel cell system of claim 3,
wherein the controller is configured to control the heat recovery valve, and
wherein the controller is configured to control the heat recovery valve to open to the first heat exchanger and provide the cooling water discharged from the water supply tank to the first heat exchanger.

5. The fuel cell system of claim 4, wherein the controller controls the heat recovery valve to open to the heat supply valve when the water temperature sensed by the first temperature sensor is equal to or more than the first set temperature.

6. The fuel cell system of claim 1, wherein the controller controls the heat supply valve to open to the water supply valve and provide the cooling water to the heat recovery tank when the temperature of the cooling water sensed by the second temperature sensor is equal to or more than the second set temperature in the power generation mode.

7. The fuel cell system of claim 1, wherein the first set temperature is higher than the second set temperature.

8. The fuel cell system of claim 1, further comprising:

a heat supply pump configured to control a flow of the cooling water circulated in the fuel processing apparatus, the water supply tank, and the heat recovery tank.

9. The fuel cell system of claim 1, further comprising:

a cooling water pump disposed between the water supply tank and the stack, and configured to provide the cooling water in the water supply tank to the stack.

10. The fuel cell system of claim 9, wherein the controller is configured to control operation of the cooling water pump, wherein the controller controls the cooling water pump to provide the cooling water to the stack in a power generation mode.

11. The fuel cell system of claim 1, comprising:

a second heat exchanger disposed in the water supply tank, and configured to exchange heat between the cooling water from the first heat exchanger and the cooling water in the water supply tank; and a third heat exchanger disposed in the heat recovery tank, and configured to exchange heat between the cooling water from the first heat exchanger and the hot water in the heat recovery tank.

12. The fuel cell system of claim 11, wherein the fuel processing apparatus includes a burner configured to provide heat energy for generating the reforming gas, and the first heat exchanger is disposed to be close to the burner from which exhaust gas is discharged after a combustion reaction of fuel.

13. A fuel cell system comprising:

a stack configured to generate power based on an electrochemical reaction of reforming gas and air;

a fuel processing apparatus configured to provide the reforming gas and to provide exhaust gas;

a water supply tank configured to store the water;

a heat recovery tank configured to store hot water;

a first heat exchanger configured to exchange heat between cooling water and the exhaust gas from the fuel processing apparatus, and to provide cooling water based on the exchanged heat; and a heat supply valve configured to selectively provide the cooling water from the first heat exchanger to the water supply tank or to the heat recovery tank, wherein the fuel cell system further comprises:

a first temperature sensor configured to sense the temperature of the water in the water supply tank;

a second temperature sensor configured to sense a temperature of water discharged from the stack; and a controller configured to control the heat supply valve to open to the water supply valve and provide the cooling water to the water supply tank when the water temperature sensed by the first temperature sensor is equal to or more than a first set temperature and the temperature sensed by the second temperature sensor is less than a second set temperature in a power generation mode.

14. The fuel cell system of claim 13, comprising:

a heat recovery valve configured to selectively provide the cooling water discharged from the water supply tank to the first heat exchanger or to the heat supply valve.

15. The fuel cell system of claim 14, wherein the controller is configured to control the heat recovery valve, wherein the controller is configured to control the heat recovery valve to provide the cooling water discharged from the water supply tank to the first heat exchanger.

16. The fuel cell system of claim 15, wherein the controller controls the heat recovery valve to open to the heat supply valve when the water temperature sensed by the first temperature sensor is equal to or more than the first set temperature.

17. A fuel cell system comprising:

a stack configured to provide power based on an electrochemical reaction of reforming gas and air;

a fuel processing apparatus configured to provide the reforming gas to be supplied to the stack;

a water supply tank configured to store the water to be supplied to the stack;

a heat recovery tank configured to store hot water;

a first heat exchanger disposed at the fuel processing apparatus, and configured to exchange heat between cooling water and exhaust gas that is discharged from the fuel processing apparatus, and to provide cooling water based on the exchanged heat;

a second heat exchanger disposed in the water supply tank, and configured to exchange heat between the cooling water from the first heat exchanger and the cooling water in the water supply tank;

a third heat exchanger disposed in the heat recovery tank, and configured to exchange heat between the cooling water from the first heat exchanger and the hot water in the heat recovery tank; and a heat supply valve configured to selectively provide the cooling water from the first heat exchanger to the water supply tank so as to heat the water in the water supply tank or to the heat recovery tank so as to heat the hot water in the heat recovery tank.

18. The fuel cell system of claim 17, wherein the fuel processing apparatus includes a burner configured to provide heat energy for generating the reforming gas, and the first heat exchanger is disposed to be close to the burner from which exhaust gas is discharged after a combustion reaction of fuel.

* * * * *